United States Patent
Hsieh

[11] Patent Number: 5,889,851
[45] Date of Patent: Mar. 30, 1999

[54] DTMF SIGNAL DETECTION/REMOVAL USING ADAPTIVE FILTERS

[75] Inventor: Shwu-Liang Luke Hsieh, Allentown, Pa.

[73] Assignee: Lucent Technologies Inc., Murray Hill, N.J.

[21] Appl. No.: 792,328

[22] Filed: Jan. 31, 1997

Related U.S. Application Data

[60] Provisional application No. 60/012,294 Feb. 26, 1996.

[51] Int. Cl.⁶ .................................................. H04M 11/00
[52] U.S. Cl. ........................... 379/351; 379/283; 379/286
[58] Field of Search .................................. 379/351, 386, 379/382, 383, 406, 408, 409, 410; 364/724.19; 375/350

[56] References Cited

U.S. PATENT DOCUMENTS

| | | | |
|---|---|---|---|
| 4,580,016 | 4/1986 | Williamson | 379/31 |
| 4,599,495 | 7/1986 | Richards | 379/351 |
| 4,853,958 | 8/1989 | Rapibour et al. | 379/386 |
| 5,325,204 | 6/1994 | Scarpa | 379/350 |
| 5,392,348 | 2/1995 | Park et al. | 379/386 |
| 5,400,394 | 3/1995 | Raman et al. | 379/410 |
| 5,528,663 | 6/1996 | Locke et al. | 379/386 |
| 5,631,957 | 5/1997 | Greiss et al. | 379/406 |
| 5,694,466 | 12/1997 | Xie et al. | 379/283 |

OTHER PUBLICATIONS

P. Mock, "Add DTMF Generation and Decoding to DSP-$\mu$ designs," *EDN*, Mar. 21, 1985. pp. 205–220.

G. Smith, "Dual–Tone Multifrequency Receiver Using the DSP Digital Signal Processor," *AT&T Application Note*. 1989.

B. Widrow, and S.D. Sterns, "Adaptive Signal Processing", *Prentice–Hall*, NJ. 1986. pp. 56–57.

S. Haykin, Adaptive Filter Theory, *Prentice–Hall*, NJ. 1986. pp. 290–291.

*Primary Examiner*—Daniel S. Hunter
*Assistant Examiner*—Jacques M. Saint-Surin

[57] ABSTRACT

An input digital sample containing voice and DTMF signal is used as an input to an adaptive filter. The output signal of the adaptive filter is used to generate a residue from the difference between the input sample and the output signal. The residue signal is used to update the coefficients of the adaptive filter. Upon the convergence of the adaptive filter, the residue signal comprises voice reduced DTMF signal while the adaptive filter's output signal contains the detected DTMF signal.

8 Claims, 1 Drawing Sheet

DTMF SIGNAL DETECTION/REMOVAL USING ADAPTIVE FILTERS

CROSS REFERENCE TO RELATED APPLICATION

This application claims the benefit of U.S. Provisional Application No. 06/012,294, filed Feb. 26, 1996.

BACKGROUND OF THE INVENTION

1. Field of the Invention

The present invention is related to telecommunications; more specifically, communications involving DTMF dual-tone multiple frequency signals.

2. Description of the Related Art

DTMF signaling is commonly used in the telephone system. Each DTMF digit or signal contains a pair of tones, which are selected from a low group of four frequencies (697 Hz, 770 Hz, and 941 Hz) and a high group of four frequencies (1209 Hz, 1336 Hz, and 1633 Hz), respectively. DTMF signaling is used for call setup and control, sometimes in the presence of speech and noise. In many applications it is necessary to detect or remove DTMF signals.

Currently, some techniques exist for detecting DTMF input signals within an input audio signal using Goertzel algorithms, tuned filters, and adaptive filters. The Goertzel algorithm is widely used for DTUF signal detection with commercial DSP processors "Add DTMF generation and decoding to DSP-$\mu$P designs", P. Mock, EDN, Mar. 21, 1985 and "Dual-Tone Multifrequency Receiver Using the DSP16 Digital Signal Processor", G. Smith, AT&T Applicaton Note, 1989. It is a modified Fourier transform, which computes the content of a specific frequency, instead of the whole spectrum. The energy in that frequency is used to decide its presence through a threshold. A more advanced technique for DTNF signal detection is described in U.S. Pat. 5,392,248 (S. Park, and D. Funderburk, "DTMF Detection Having Sample Rate Decimation and Adaptive Tone Detection," issued Feb. 1995, filed Nov. 25, 1991.) It separates the incoming signal into two bands with a filter, then adaptively determines the frequency and the magnitude of any existing tone. However, all of these techniques solely detect DTMF signals and do not remove the DTMF signals or mute the speech from the input audio signal within the same operation which is useful for many voice communications systems for quickening and optimizing call processing and other operations. Additionally, many of these solutions require several DSP iterations and components to work effectively which increases costs and reduces speed. Therefore, there is a need to effectively integrate DTMF signal detection and removal within a single operation to provide the desired voice communications applications without unduly comprising speed, accuracy, or cost.

SUMMARY OF THE INVENTION

An embodiment of the present invention provides a low-cost, efficient solution for integrating dual-tone multiple frequency (DTMF) signal detection and removal within one circuit design. An input digital sample containing voice and a DTMF signal is compared to the output signal of an adaptive filter where a residue signal is generated from the difference between the input sample and the output signal and the residue signal is used to update the coefficients of the adaptive filter. Upon the convergence of the adaptive filter, the residue signal comprises voice and reduced DTMF signal while the output signal contains the detected DTMF signal.

In yet another embodiment, a filter with eight quadrature inputs (the eight tones of the standard) is set up to identify the DTMF tones with speech and noise present. A LMS (least-means square) algorithm is used to update the coefficients of the filter. Once the algorithm has converged, the coefficients of the filter are used to predict the presence of any DTMEF and its output contains the DTMF tones without speech or noise. The residue has a speech signal with reduced DTMF.

DETAILED DESCRIPTION OF THE INVENTION

Figure 1:
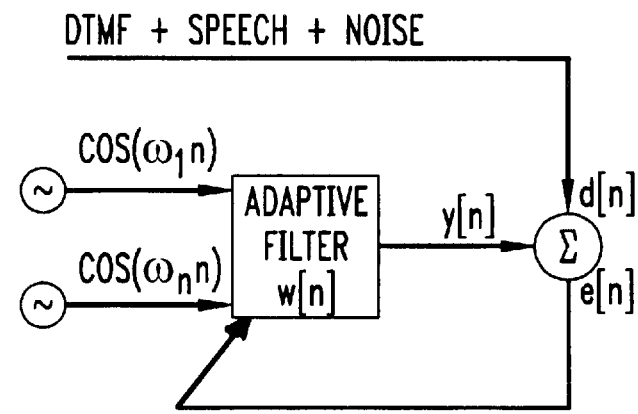
FIG. 1 is a block diagram of the DTMF detection/removal system.

FIG. 1 shows the block diagram for DTMF detection and removal. The adaptive filter block contains coefficients, w[n] where n is the time instant, which are updated with every incoming sample. The filter has eight sinusoidal inputs corresponding to the eight tones used in DTMF signaling. The output of the adaptive filter block, y[n], is compared with the incoming sample, d[n], which is the DTMF plus speech and noise. The residue, e[n], or the difference between d[n] and y[n] is used to update the coefficients, w[n], using adaptive algorithms. The LMS algorithm is chosen due to its simplicity. LMS algorithms are discussed in "Adaptive Signal Processing", B. Widrow and S. D. Stearns, Prentice-Hall, N.J. 1985. Advanced algorithms, such as the Kalman algorithm are also used for performance comparison. "Adaptive Filter Theory", S. Haykin, Prentice-Hall, N.J., 1986. Once the filter has converged, the coefficients, w[n], are used to predict the presence of the DTMF tones. The output of the filter, y[n], will contain the DTMF tones, while the residue, e[n], will contain speech, noise, and reduced DTMF tones.

Figure 2:
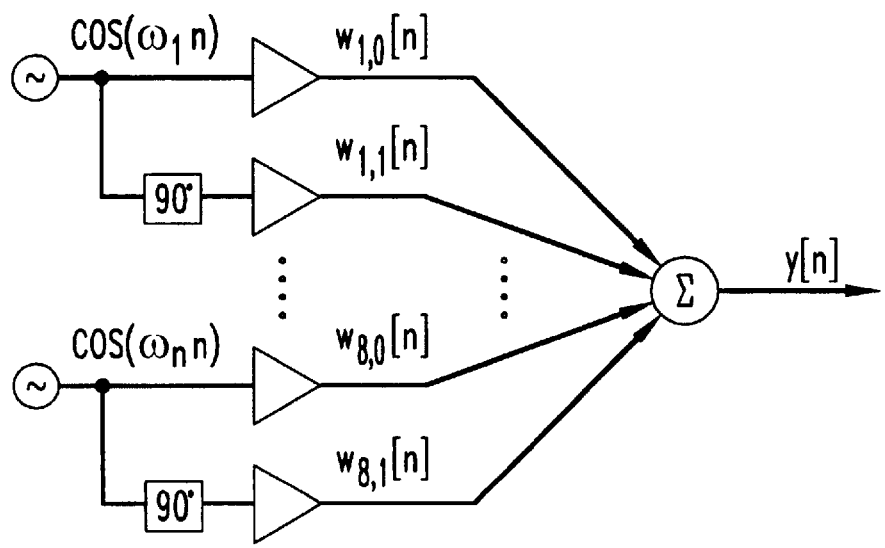
FIG. 2 is block diagram of the adaptive filter in FIG. 1 showing quadrature inputs.

FIG. 2 shows the block diagram of the adaptive filter. Each of the eight inputs is delayed by 90 degrees to form a quadrature input. Every input is multiplied by a weight, w[n], and is then summed together as the output, y[n].

In vector form, the output of the adaptive filter, y[n], is expressed as $$y[n] = w^T[n]x[n] \qquad (1)$$

where $$w[n] = [w_{1,0}[n]w_{1,1}[n] \ldots w_{8,0}[n]w_{8,1}[n]]^T \qquad (2)$$

and $$x[n] = [\cos(\Omega_1 n) \sin(\Omega_1 n) \ldots \cos(\Omega_8 n) \sin(\Omega_8 n)]^T \qquad (3)$$

The residue or instantaneous error, e[n]=d[n]−y[n], is used to update the weight coefficients using the equation $$w[n+1] = w[n] + \mu e[n]x[n] \qquad (4)$$

where $\mu$ is the adaptation step or the learning rate.

Equation 4 was developed using the well known LMS algorithm;
however, other algorithms such as the Kalman algorithm may be used to develop an equation similar to equation 4.

There are four main factors that affect the performance of the LMS algorithm:

the input autocorrelation matrix $R=E\{x[n]x^T[n]\}$
the length of the filter N
the initial condition of the weights
and the adaptation step size $\mu$.

In this embodiment, the filter length is N=16, and when x[n] of equation 3 is used the autocorrelation matrix R=I/2 (I is the identity matrix). The weights are set to 0 initially. The step size, $\mu$, is usually determined by the power of the input signal. The larger the $\mu$ is, the faster the filter converges at the cost of larger mean-square errors at the point of convergence and at the risk of divergence. Here the step size is determined by the input power and the bit resolution of the DSP processors.

The filter coefficient or weights are updated until the filter output y[n] is representative of the input DTMF signal, and/or the residue e[n] is representative of the input speech signal or the DTMF component of the residue is below a threshold.

The following simulation results support the above analysis. The statistical view of the data reveals the efficiency of the DTMF detection and removal. Gaussian noise and real speech are used for the simulation. The algorithm is being implemented with a DSP processor.

Table 1 shows the performance of the detection under different noise levels. It contains the statistics of 300 runs. The DTMF frequencies are 770 Hz and 1477 Hz. Their energy levels are normalized and compared to their adjacent tones. For example, row 3 displays a noise energy level of −20 dB down from the normalized DTMF tones. The detected energy of the 770 Hz has a small standard deviation of 0.021, as in column (B1). (B2) shows the ratio of the energies of the 770 Hz vs. 697 Hz with a mean of 30.4 dB and a standard deviation of 1.2 dB. (B3) shows the same thing as in (B2), however it is 770 Hz vs. 852 Hz. Columns (C) repeat (B) with 1477 Hz vs. 1336 Hz and 1633 Hz. It is observed that the results imply an accurate DTMF detection even with a high noise level.

TABLE 1

| (A) | (B1) mean/std | (B2) mean/std | (B3) mean/std | (C1) mean/std | (C2) mean/std | (C3) mean/std |
| --- | --- | --- | --- | --- | --- | --- |
| −6 dB | 1/.082 | 30.2/6.2 dB | 36.4/8.8 dB | 1/.081 | 50.6/11.5 dB | 44.5/11.6 dB |
| −10 dB | 1/.056 | 30.7/4.2 dB | 36.5/5.4 dB | 1/.055 | 58.0/12.5 dB | 50.1/10.3 dB |
| −20 dB | 1/.021 | 30.4/1.2 dB | 37.5/1.8 dB | 1/.018 | 76.3/11.4 dB | 54.0/4.80 dB |
| −40 dB | 1/.0017 | 30.3/.12 dB | 37.3/.17 dB | 1/.017 | 82.8/2.20 dB | 54.1/.460 dB |

As mentioned above, Table 1 shows performances at different noise levels. It should be noted that (A) the Gaussian noise energy down from the DTMF energy, (B1) refers to the mean and standard deviation of the energy of the detected DTMF (normalized in the low group), (B2) refers to the ratio of the energy of the detected DTMF to the energy of the adjacent lower tone in the low group, (B3) refers to the ratio of the energy of the detected DTMF to the energy of the adjacent higher tone in the low group, and (C1)–(C3) are similar, except that they are for the high frequency group.

Once the filter has converged, the residue error contains speech signals with significantly reduced DTNF tones. Table 2 shows the effectiveness of DTMF removal for different adaptation steps $\mu$. The values in dB represent the averaged energy deviation of the residue error from the original speech in each frequency bin. For example, in the first column the step size is set to 0.1. After the filter has converged, the residue with reduced DTMF tones is compared with the original speech in frequency domain. The averaged difference is −53.2 dB.

TABLE 2

Effectiveness of DTMF removal.

| adaptation step, $\mu$ | 0.1 | 0.05 | 0.02 | 0.01 |
| --- | --- | --- | --- | --- |
| effectiveness of DTMF removal | −53.2 dB | −57.3 dB | −64.8 dB | −67.9 dB |

The invention claimed is:

1. A method for dual-tone multiple frequency signal detection and removal, comprising:

receiving an input signal having a plurality of components, at least one of the components being an input dual-tone multiple frequency signal, the input dual-tone multiple frequency signal having at least one input tone signal belonging to a plurality of input tone signals;

modifying a plurality of tone signals using a plurality of adjustable weights by modifying each tone signal belonging to the plurality of tone signals by an adjustable weight belonging to the plurality of adjustable weights to produce a plurality of weighted tone signals;

summing the plurality of weighted tone signals to produce a summed tone signal representative of the input dual-tone multiple frequency signal; and summing the summed tone signal and the input signal to produce a residue signal representative of the input signal with a reduced input dual-tone multiple frequency signal component.

2. The method of claim 1, further comprising the step of modifying at least one adjustable weight until a dual-tone multiple frequency signal component of the residue signal crosses a threshold.

3. The method of claim 1, further comprising the step of:

modifying a plurality of quadrature tone signals using a plurality of quadrature adjustable weights by modify-
ing each quadrature tone signal belonging to the plurality of quadrature tone signals by a quadrature adjustable weight belonging to the plurality of quadrature adjustable weights to produce a plurality of weighted quadrature tone signals; and wherein the step of summing the plurality of weighted tone signals comprises summing the plurality of weighted tone signals and the plurality of weighted quadrature tone signals to produce the summed tone signal.

4. The method of claim 3, further comprising the step of generating the plurality of tone signals using a plurality of oscillators.

5. The method of claim 3, further comprising the step of generating the plurality of quadrature tone signals by phase shifting each of the plurality of tone signals.

6. An apparatus for the detection and removal of a dual-tone multiple frequency signal from an input signal, the input signal having a plurality of components, at least one of the components being an input dual-tone multiple frequency signal, the input dual-tone multiple frequency signal having at least one input tone signal belonging to a plurality of input tone signals, the apparatus comprising:

- a plurality of tone generators that generate a plurality of tone signals, each tone generator outputting a tone signal representative of one of the plurality of input tone signals;
- a first plurality of multipliers that modify the plurality of tone signals using a plurality of adjustable weights by multiplying each tone signal belonging to the plurality of tone signals by an adjustable weight belonging to the plurality of adjustable weights to produce a plurality of weighted tone signals;
- a first summer that sums the plurality of weighted tone signals to produce a summed tone signal representative of the input dual-tone multiple frequency signal; and
- a second summer that sums the summed tone signal and the input signal to produce a residue signal representative of the input signal with a reduced input dual-tone multiple frequency signal component.

7. The apparatus of claim 6, further comprising:
- a plurality of phase shifters that generate a plurality of quadrature tone signals using the plurality of tone signals;
- a second plurality of multipliers that modify the plurality of quadrature tone signals using a plurality of quadrature adjustable weights by multiplying each quadrature tone signal belonging to the plurality of quadrature tone signals by a quadrature adjustable weight belonging to a plurality of quadrature adjustable weights to produce a plurality of weighted quadrature tone signals; and
- wherein the first summer forms the sums of the plurality of weighted tone signals and the plurality of weighted quadrature tone signals to produce the summed tone signal.

8. The apparatus of claim 6, wherein the tone generators are oscillators.

* * * * *